US006481158B1

(12) United States Patent
Marks

(10) Patent No.: US 6,481,158 B1
(45) Date of Patent: Nov. 19, 2002

(54) METHOD AND APPARATUS FOR A QUICK RELEASE SECURITY GRILL SYSTEM

(76) Inventor: Chester J. Marks, 700 W. Alexander Ave., Lafayette, LA (US) 70501

( * ) Notice: Subject to any disclaimer, the term of this patent is extended or adjusted under 35 U.S.C. 154(b) by 0 days.

(21) Appl. No.: 09/872,935

(22) Filed: Jun. 2, 2001

(51) Int. Cl.[7] .............................. E06B 3/68; E05B 65/10
(52) U.S. Cl. ............................... 49/57; 49/394; 49/141; 292/177
(58) Field of Search ................................. 49/50, 55, 56, 49/57, 463, 465, 394, 141; 292/177, 180, 171, 62, 38; 256/73, 59, 67; 52/202, 208, 64, 203, 71, 646; 70/256

(56) References Cited

U.S. PATENT DOCUMENTS

| | | | | |
|---|---|---|---|---|
| 1,863,129 A | * | 6/1932 | Stonebridge | 49/141 X |
| 3,282,617 A | * | 11/1966 | Wason | 49/394 X |
| 3,908,311 A | * | 9/1975 | Romberg | 49/381 |
| 4,005,886 A | * | 2/1977 | Lirette | 292/177 |
| 4,050,723 A | * | 9/1977 | Papadatos | 292/177 X |
| 4,057,935 A | * | 11/1977 | Rohrberg et al. | 49/141 X |
| 4,127,966 A | * | 12/1978 | Schmidt | 49/141 |
| 4,258,504 A | * | 3/1981 | Hicks | 49/56 |
| 4,263,747 A | * | 4/1981 | Coltrin et al. | 49/56 |
| 4,685,316 A | * | 8/1987 | Hicks et al. | 49/141 X |
| 4,796,384 A | * | 1/1989 | Warwick | 49/55 |
| 4,897,961 A | * | 2/1990 | Shine | 49/141 |
| 5,103,658 A | * | 4/1992 | McQuade | 49/394 X |
| 5,410,841 A | * | 5/1995 | Harris et al. | 49/141 X |
| 5,557,889 A | * | 9/1996 | Sharp | 49/394 X |
| 5,609,371 A | * | 3/1997 | Mader et al. | 292/164 |
| 5,619,821 A | * | 4/1997 | St. George et al. | 49/57 |
| 5,657,578 A | * | 8/1997 | Thompson | 49/141 |
| 5,802,765 A | * | 9/1998 | Vickery | 49/67 |
| 6,176,042 B1 | * | 1/2001 | Rossman et al. | 49/463 |
| 6,216,391 B1 | * | 4/2001 | Garrett, Jr. | 49/141 |
| 6,357,509 B1 | * | 3/2002 | Lamazares | 49/56 X |

* cited by examiner

*Primary Examiner*—David M. Purol
*Assistant Examiner*—Hugh B. Thompson
(74) *Attorney, Agent, or Firm*—Robert N. Montgomery

(57) ABSTRACT

A security grill adapted to securely close off a window or door but which may be manually released from within the building and allowing egress through the window while maintaining security and preventing unauthorized access from the exterior of the building. The grill is attached along one side by hinges and is lockable in position by a locking device on an opposite side. The locking device being a keyed dead bolt, which protrudes into a rapid release mechanism secured and shielded in the surrounding frame, which is secured by bolts to the building. The grill being spring biased to the open position with the release mechanism operable from inside the building also biased for rapid release.

15 Claims, 4 Drawing Sheets

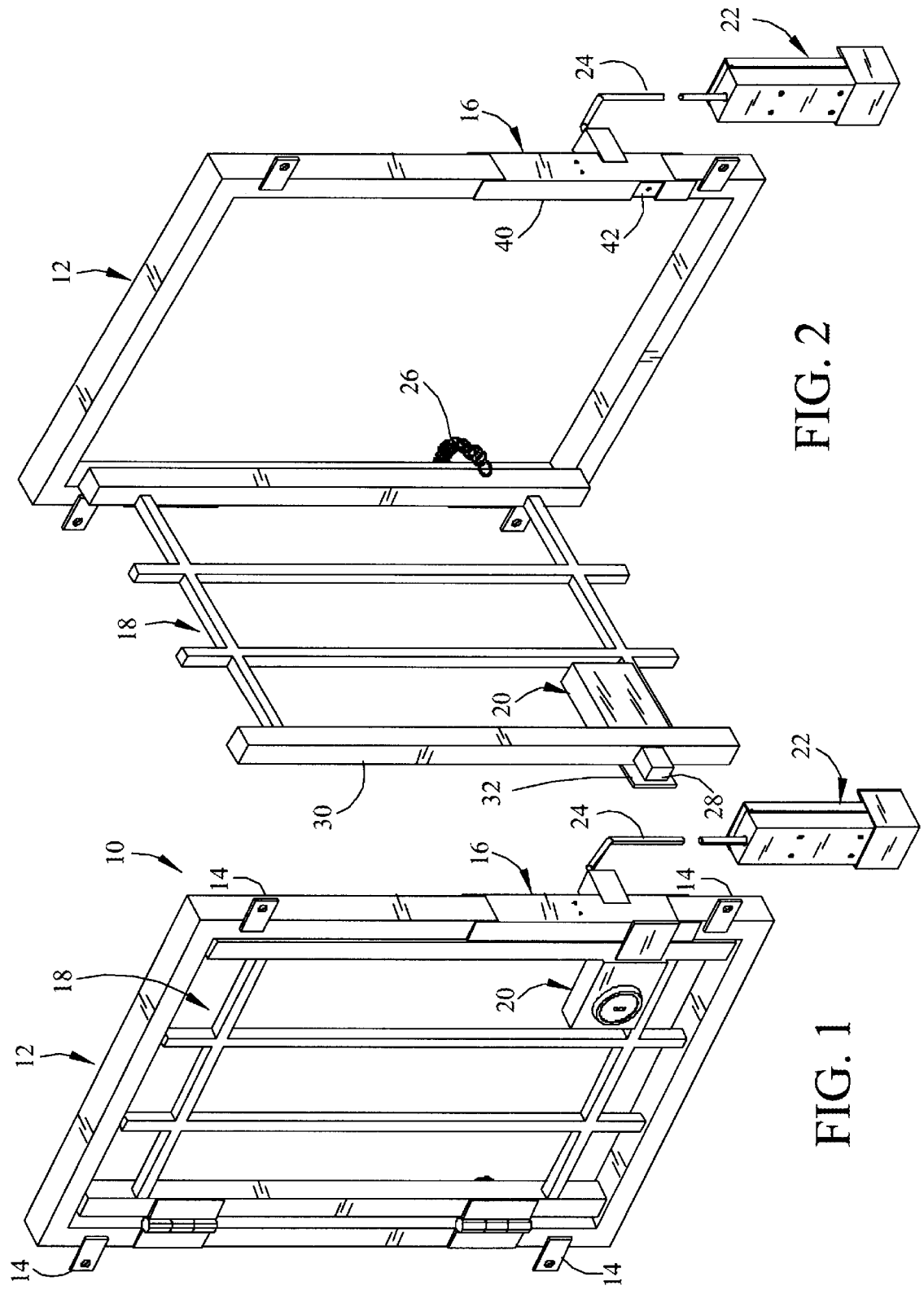

METHOD AND APPARATUS FOR A QUICK RELEASE SECURITY GRILL SYSTEM

BACKGROUND OF THE INVENTION

1. Field of the Invention

This invention relates generally to an improved metal security grill structure that prevents entrance through a window or door opening and more particularly to a grill which is rigidly secured to the building structure, yet allows rapid egress from within the structure in an emergency.

2. General Background

Various types of grill structures have been developed for covering window and doors to prevent unlawful entry into a building structure. Many such grill structures are, by their very nature, difficult to remove and often require special tools. Unfortunately, security bars for windows and doors have become a necessary evil to insure the perceived well-being of the occupants. As a result, a great many families have inadvertently locked themselves into potentially life-threatening situations by installing bars that fail to provide rapid egress in an emergency, such as fire. In recent years the death rate from fire as a result of blocked windows and doors has steadily increased.

Building codes are being adopted in many states to regulate the installation of security bars to insure rapid egress, thereby challenging the industry to develop safer security systems. These codes are often very strict, requiring that every basement and sleeping room below the fourth floor shall have at least one operable window or exterior door approved for emergency escape. These emergency escape windows or doors must provide a full, clear opening and shall be operable from the inside dwelling without the use of separate tools or special knowledge. Bars, grills, grates, security roll down shutters, or similar devices may be installed on emergency escape windows or exit doors provided such devices are equipped with approved quick release mechanisms which are openable from the inside the dwelling without the use of a key or special knowledge or effort. These requirements apply to any security device installed over emergency escape windows, doors, or window wells regardless of when it was installed.

A building permit is also required for the new installation of any of the above security bar devices, as well as for the retrofit installation of any quick release mechanism installed over the required bedroom egress opening.

Typical code requirements for security grills now requiring Quick Release Mechanisms are as follows:

1. The quick release latch for egress windows shall be actuated by a readily accessible knob, handle, or button which may be grasped by hand and operated by a single twist, turn, or pull or by pedal which may be pushed by foot. The use of slide bolts, pull chain bolts, and releases requiring both hands for actuation are prohibited. The quick release latch shall be unobstructed, readily visible and accessible, mounted no greater than 36 inches from the edge of the window, at a height not to exceed 48 inches above the finished floor as measured from the center of the device. The release latch shall not require more than 10 pounds of force to unlatch the security device to the fully opened position.
2. Security devices over emergency escape doors may be provided with a night latch, dead bolt, or security chain, provided such devices are openable from the inside without the use of key or special tool.
3. A licensed contractor, building owner or his representative shall properly install each quick release system. (Per manufacturer's instructions)
4. Each system shall be installed in conjunction with smoke detectors, installed as per section 310.9 of the UBC.
5. Each system must be field tested for proper operation and witnessed by the Building Inspector prior to acceptance.
6. The installed bars, grills, or grates must not restrict the available light or ventilation through the required windows by more than 15%. When open, the bars must not diminish the required minimum clear openable area of the egress window or exit door.
7. The release mechanism must be manufactured from corrosive resistant materials.
8. The manufacturer must provide maintenance instructions to the building owner to ensure proper long-term functionality.
9. Installers will be required to test each release mechanism and complete the attached certificate to verify that the installation fully complies with this Policy.

Inspection Process:

1. A final inspection will be required. The proper location of each release mechanism will be verified and operation of all release mechanism(s) will be field-tested.
2. The contractor or owner of the property will be responsible to reset each release mechanism and to close the window grill.
3. A certificate of proper installation must be completed for each dwelling unit by the installer prior to final inspection. During final inspection the certificate shall be made available to the inspector for their review. The certificate will be returned to the owner or tenant for their records.

It is an object of the instant invention to meet or exceed the aforementioned security grill or gate requirements.

SUMMARY OF THE INVENTION

An improved security grill for building openings, the improvements structured to comply with recent building requirements for security grills that do not impede emergency egress from buildings fitted with such devices. The security grill system herein including a tubular frame having a biased latch integral therewith, the frame fitted within the building opening and secured to the building, the frame having a biased lattice pivotally hinged therein and fitted with a keyed dead bolt lock located adjacent the biased latch in the frame. The biased latch captures the dead bolt when extended. A biased remote release trigger located inside the building is provided and attached to the latch for remotely releasing the dead bolt from the latch, allowing the biased lattice to spring open. The lattice may be opened with the dead bolt lock key at any time for window maintenance without disturbing the emergency release latch. The release trigger and latch are manually resettable.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 1 is an isometric view of the preferred embodiment;

FIG. 2 is an isometric view illustrating the preferred embodiment in the open position;

DETAILED DESCRIPTION OF THE PREFERRED EMBODIMENT

Figures 3, 4:
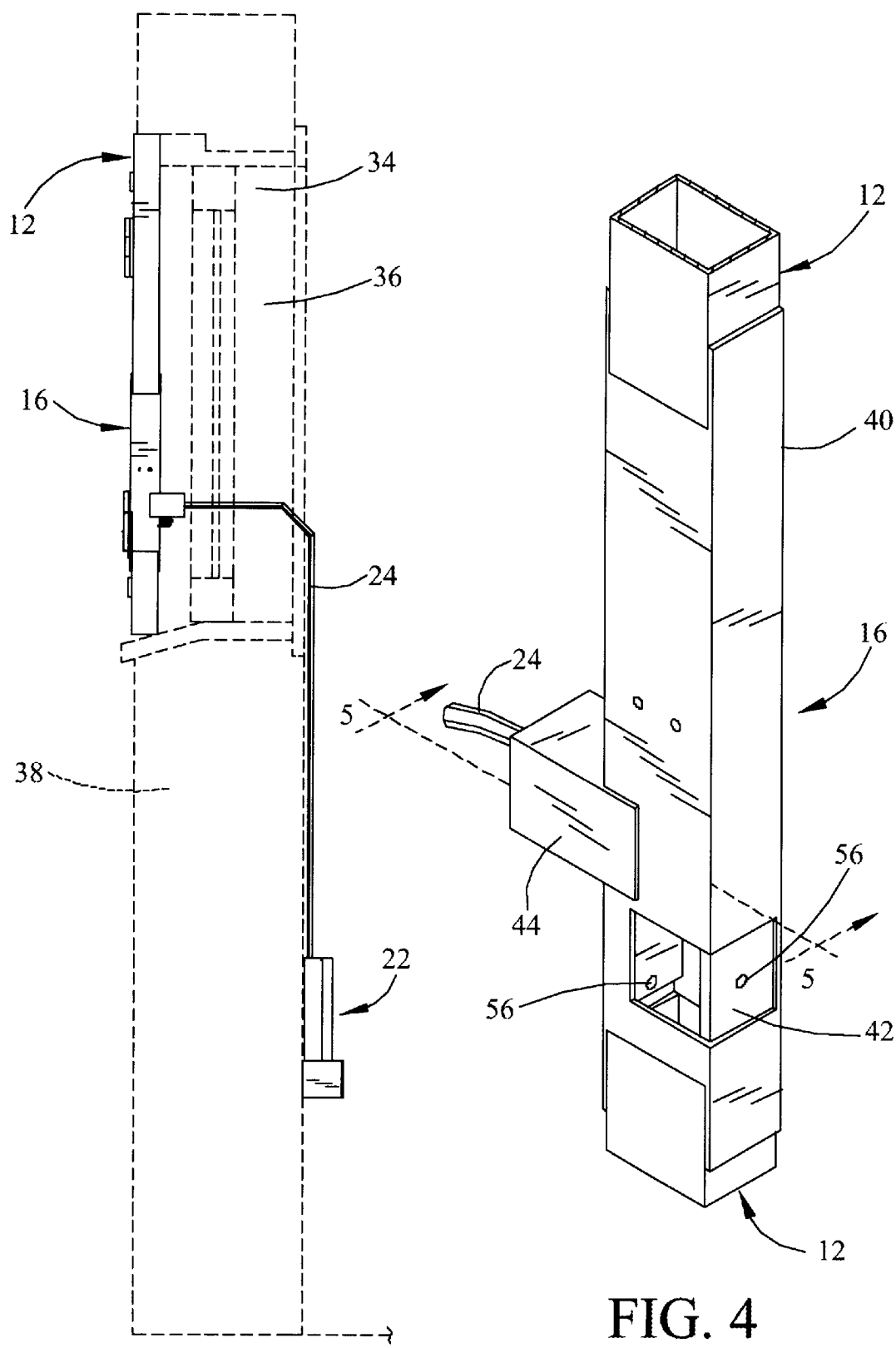
FIG. 3 is a cross section view of the preferred embodiment as mounted in building wall.
FIG. 4 is an isometric view of the latch assembly.

Looking a FIG. 1 we see the improved security grill 10 includes a tubular frame 12 generally configured to fit inside a building opening, usually over a window or door, and attached to the building by tabs 14 secured with one way bolts etc., the frame having latch assembly 16 as an integral member, a biased lattice 18 composed of vertical and horizontal tubes and bars, or some decorative design thereof, pivotally mounted within said frame, the lattice having a keyed dead bolt lock assembly 20 integral therein located adjacent the latch assembly 16. A sliding cable attaches a remote biased release trigger 22 to the latch assembly 16, thereby completing the assembly.

As seen in FIG. 2, the lattice 18 is biased by a compression spring 26 connected to the backside of the frame 12 and the lattice 18, thereby urging the lattice outwardly when released. The keyed dead bolt latch assembly 20 is welded in place in the lattice 18 in a manner whereby the dead bolt 28 extends through lattice member 30. Access to the dead bolt 28 is denied by cover plate 32, also serving as a stop when closing the lattice 18.

As seen in FIG. 3 the security grill 10 may be located over a window 34 or door located in a wall opening 36. Although shown located inside the opening, the grill 10 could be located externally as well. The sliding cable 24, when connected to the latch assembly 16, extends through the wall 38 and is surface mounted to the inside wall and connects to the remote trigger 22.

Figures 5, 6:
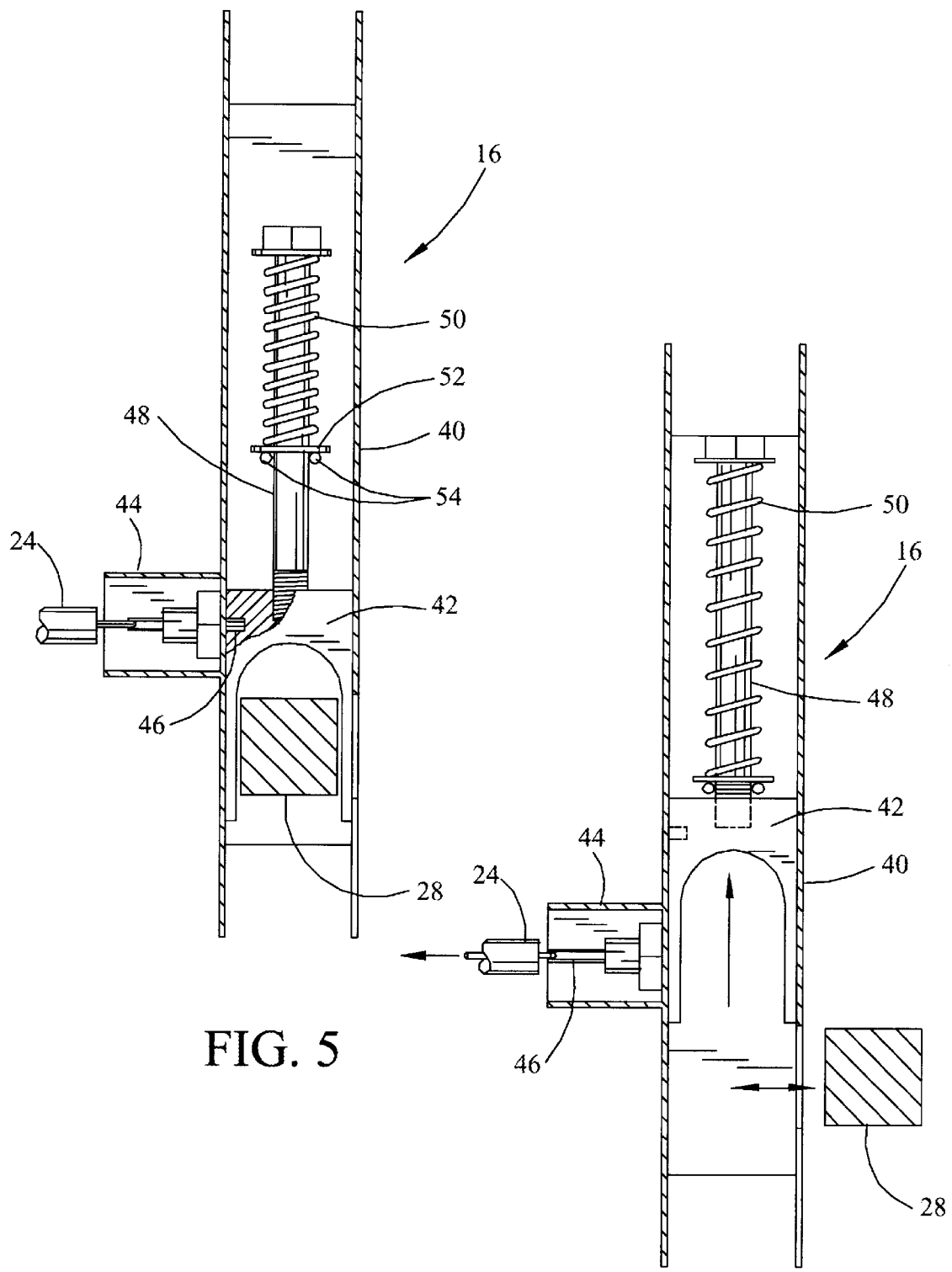
FIG. 5 is a cross section view of the latch assembly illustrated in FIG. 4 in the latched position.
FIG. 6 is a cross section view of the latch assembly illustrated in FIG. 4 in the unlatched position.

Looking now at FIG. 4, we see the latch assembly 16 is comprised of a tubular member 40 integrally welded within the frame 12. The tubular member 40 is notched on two adjacent sides exposing the releasable latch member 42. A second tubular member 44 is attached at installation to impede access to the cable 24 and its connection to the latch release pin 46, better seen in FIGS. 5 and 6. As shown in FIG. 5, the latch assembly 16 straddles the dead bolt 28. A threaded member 48 is biased in the downward direction by a compression spring 50 held in compression by a washer 52 slidable along the threaded member 48 supported by a pair of pins 54 extending through the tubular member 40, the threaded member 48 being threadably attached to the top of the latch member 42. Therefore, when the release pin 46 is retracted as seen in FIG. 6, the latch member 42 is drawn upwards as a result of the spring 50 bias, thereby releasing the dead bolt 28 and allowing the lattice 18 to spring outwards from the member 40. Holes 56 are provided in the legs of the latch member 42, as seen in FIG. 4, for contacting with a bent tool when resetting the latch.

Figure 9:
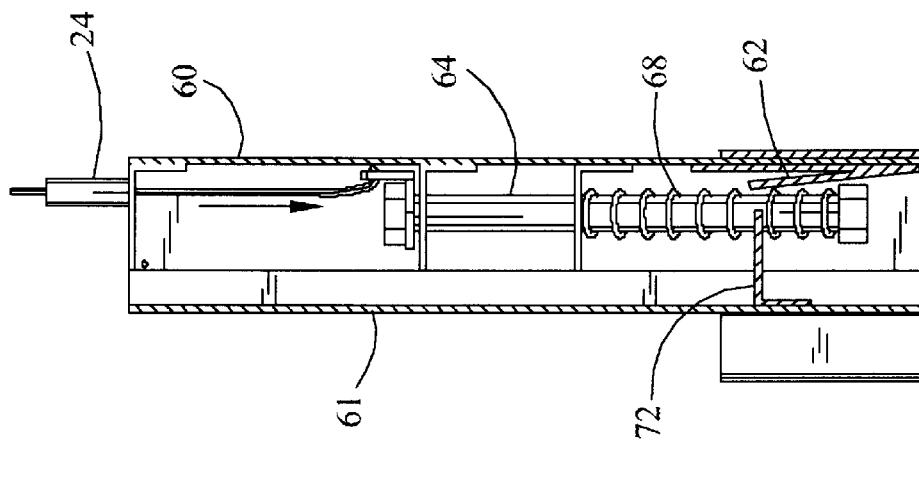
FIG. 9 is a cross section view of the remote release latch assembly taken along sight lines 8—8 as seen in FIG. 7 with the biased release trigger in the released position.
Figure 8:
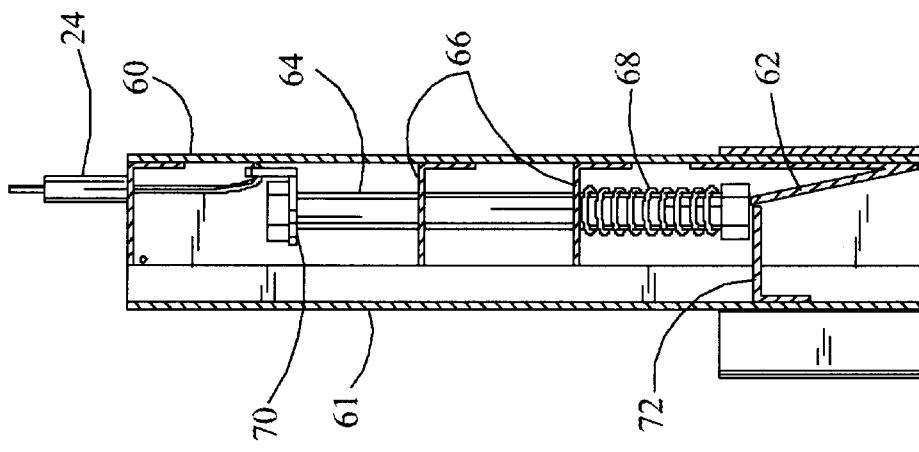
FIG. 8 is a cross section view of the remote release latch assembly taken along sight lines 8—8 as seen in FIG. 7 with the biased release trigger in the set position.
Figure 7:
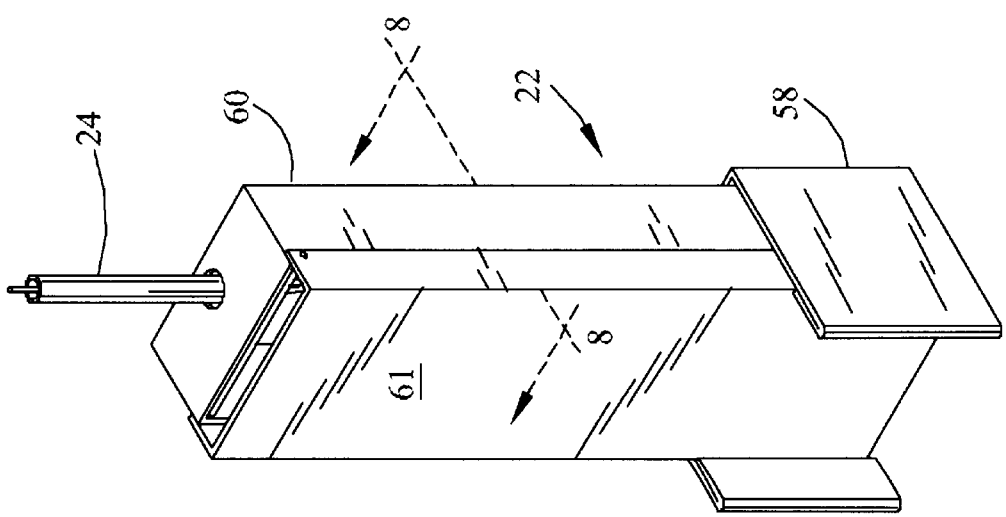
FIG. 7 is an isometric view of the remote release latch assembly.

Looking now at FIG. 7, the remote release trigger assembly 22 includes a housing 60 having a spring cover 61 held in the closed position by the cover latch member 58. Cover 60 release is accomplished by spreading the sides of the cover latch member 58. Opening the cover 60 exposes the trigger mechanism held in a latched or cocked position by a springable latch member 62 as shown in FIG. 8. The trigger mechanism includes a sliding rod 64 passing through guides 66 and biased by a compression spring 68. A clip 70 connects one end of the sliding cable 24 to the sliding rod 64. Release is accomplished as seen in FIG. 9 by compressing cover 61 inwardly, thereby triggering the spring latch member 62 with the slotted contact member 72, subsequently depressing the latch member 62 and allowing the biased rod 64 to travel downward retracting the slidable cable 24 and thus retracting the release pin 46 shown in FIG. 6.

This unique method of security grill release allows the grill to be opened by key without disturbing the biased spring release by simply withdrawing the dead bolt 28 with the keyed lock 20. Releasing the spring biased trigger 22 eliminates the need for cams, levers, keys, and/or expensive locking devices to retain and open the grill and further eliminates the need for levers or special tools for removing the grill from the window or door of a building.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A security grill comprising:
    a) a frame having a biased latch assembly integral therein;
    b) a lattice comprising a key lockable dead bolt having locked and unlocked positions located integral therein, said lattice being pivotally attached to said frame, said dead bolt operably engaging said biased latch assembly when in said locked position;
    c) a biased trigger means located remotely connected to said biased latch assembly for releasing said dead bolt from said biased latch assembly while in said locked position; and
    d) a means for remotely connecting said biased trigger means to said biased latch assembly.

2. The security grill according to claim 1 wherein said biased latch assembly comprises:
    a) an elongated tubular housing having a notched wall portion capable of receiving but not retaining said dead bolt when extended;
    b) an elongated internal sliding element having a normally open position and a closed position, said sliding element being capable of receiving and retaining said dead bolt when extended;
    c) a means for biasing said internal sliding element in said normally open position; and
    d) a retractable release means for retaining said internal sliding element in said closed position.

3. The security grill according to claim 1 wherein said biased trigger means comprises:
    a) a housing having a biased pivotal cover;
    b) an internal sliding element having a closed position but biased in a normally open position;

c) a biased means for retaining said internal sliding element in said closed position; and d) a trigger attached to said pivotal cover in contact with and capable of depressing said biased means for retaining said internal sliding element by depressing said pivotal cover, thereby allowing said internal sliding element to move to said open position.

4. The security grill according to claim 1 wherein said means for remotely connecting said biased trigger means to said biased latch assembly is a sliding cable.

5. The security grill according to claim 1 wherein said lattice is biased towards an open position.

6. A quick release security grill comprising:

a) a tubular metal frame generally conforming to the size of a building opening, the frame defining an open area therein;

b) a plurality of tabs attached to said frame for attachment to said building opening;

c) a lattice covering at least a predominate portion of said open area within said frame, said lattice being pivotal along a hinged side;

d) a key lock assembly having an extendable dead bolt having locked and unlocked positions, said key lock assembly integral with said lattice and located opposite said hinged side;

e) a biased latching means integral with said frame located adjacent said key lock assembly capable of capturing said dead bolt when extended to said locked position; and f) a biased trigger means located remotely attached by a sliding cable to said biased latching means for releasing said dead bolt from said biased latching means when said dead bolt is in the locked position.

7. The quick release security grill according to claim 6 wherein said biased latching means comprises:

a) an elongated tubular member having a notched corner portion removed defining a rectangular intersecting aperture in two adjacent sides;

b) an arched sliding element slidable within said elongated tubular member;

c) a release pin for releasably retaining said sliding element retractably traversing one wall of said tubular member and penetrating said arched sliding element;

d) an elongated rod element having a head portion, a washer slidable thereon, and a coil spring located mesial said head and said washer, said rod element attached to an upper end of said arched sliding element; and e) a transverse pin located on each side of said threaded member extending through said elongated tubular member at a point mesial said washer and said upper end of said arched sliding element.

8. The quick release security grill according to claim 7 wherein said trigger means comprises:

a) a housing;

b) a springable cover attached to said housing;

c) a means for releasably retaining said cover in a closed operable position;

c) an elongated rod having a head portion at each end and a coil spring slidable thereon located inside said housing in a manner whereby said rod is slidably guided within said housing and biased by said coil spring;

d) a bias element attached to said housing and in contact with said elongated rod in a manner whereby said coil spring is compressed;

e) a notched bracket member attached to said cover in such a manner whereby depression of said cover depresses said biased element, thereby releasing said elongated rod; and f) a slidable cable having an end connected to an end of said elongated rod opposite said coil spring.

9. The quick release security grill according to claim 8 wherein said slidable cable is further connected to said release pin for retaining said arched sliding element.

10. The quick release security grill according to claim 9 wherein said lattice is biased to the open position.

11. The quick release security grill according to claim 9 wherein said grill further comprises a metal enclosure for covering said release pin after connecting said slidable cable thereto.

12. The quick release security grill according to claim 9 wherein said grill further comprises a shield attached to said lattice extending outwardly covering said notched corner portion of said release latch.

13. A method for quickly releasing a security grill comprising the step of:

a) providing a security grill comprising:

i) a frame having an biased latch assembly integral therein;

ii) a lattice having a dead bolt key lock integral therein pivotally attached to said frame;

iii) a biased trigger means remotely connected to said biased latch assembly for releasing said dead bolt; and iv) a manual means for remotely connecting said biased trigger means to said biased latch assembly;

b) setting said trigger means to a biased closed and cocked position, thereby positioning said biased latch assembly to a closed position;

c) using a key to extend said dead bolt toward said frame so that said dead bolt comes into contact with said biased latch assembly whereby said biased latch assembly secures said dead bolt;

d) tripping said biased trigger means, thereby releasing said biased latch assembly and thereby releasing said dead bolt from said biased latch assembly, thus allowing said lattice to pivot open relative to said frame.

14. A method for quickly releasing a security grill comprising the steps of:

a) providing a security grill comprising;

i) a tubular metal frame generally conforming to the size of a building opening, the frame defining an open area therein;

ii) a plurality of tabs attached to said frame for attachment to said building opening;

iii) a lattice covering at least a predominate portion of said open area within said frame, said lattice being pivotal along a hinged side;

iv) a key lock assembly having an extendable dead bolt having locked and unlocked positions, said key lock assembly integral with said lattice and located opposite said hinged side;

v) a biased latching means having a retractable release pin, the latching means integral with said frame and located adjacent said lock assembly for capturing said dead bolt when extended to said locked position;

vi) a biased trigger means located remotely inside said building and attached by a sliding cable to said biased latching means for releasing said dead bolt from said biased latching means while in said locked postion; and vii) a metal enclosure for covering said release pin after connecting said slidable cable thereto b) attaching said frame to said building;

c) connecting said sliding cable to said biased latching means;

d) installing said trigger means within said building and attaching said sliding cable thereto;

e) Installing said metal enclosure after connecting said sliding cable to said release pin;

f) setting said biased trigger means whereby said biased latching means is set for quick release by said biased trigger means; and g) closing said lattice and extending said dead bolt with a key to engage said latching means.

15. The method according to claim 14 for quickly releasing a security grill further comprising the steps of depressing cover of said biased trigger means, thereby releasing said biased latching means thereby releasing said dead bolt, without the use of a key, thus allowing said lattice to pivotally open.

* * * * *